United States Patent
Weng

(10) Patent No.: US 12,050,441 B2
(45) Date of Patent: Jul. 30, 2024

(54) METHOD FOR CONTROLLING A PROCESS WITHIN A SYSTEM, PARTICULARLY A COMBUSTION PROCESS IN A BOILER OR FURNACE

(71) Applicant: AIXPROCESS GMBH, Aachen (DE)

(72) Inventor: Martin Weng, Aachen (DE)

(73) Assignee: AIXPROCESS GMBH, Aachen (DE)

(*) Notice: Subject to any disclaimer, the term of this patent is extended or adjusted under 35 U.S.C. 154(b) by 1434 days.

(21) Appl. No.: 16/380,192

(22) Filed: Apr. 10, 2019

(65) Prior Publication Data

US 2020/0326668 A1     Oct. 15, 2020

(51) Int. Cl.
*G05B 13/02* (2006.01)
*F23N 5/02* (2006.01)

(52) U.S. Cl.
CPC ........... *G05B 13/027* (2013.01); *F23N 5/022* (2013.01); *F23N 2223/44* (2020.01); *F23N 2223/52* (2020.01)

(58) Field of Classification Search
CPC ... G05B 13/027; F23N 5/022; F23N 2223/52; F23N 2223/44
See application file for complete search history.

(56) References Cited

U.S. PATENT DOCUMENTS

| | | |
|---|---|---|
| 5,259,064 A | 11/1993 | Furuta et al. |
| 5,740,033 A | 4/1998 | Wassick et al. |
| 5,943,660 A | 8/1999 | Yesildirek et al. |
| 7,035,717 B2 | 4/2006 | Wintrich et al. |

(Continued)

FOREIGN PATENT DOCUMENTS

| | | |
|---|---|---|
| CN | 101266462 | 9/2008 |
| CN | 101581454 | 11/2009 |

(Continued)

OTHER PUBLICATIONS

English translation of Office Action from related Chinese Appln. No. 2018108954961, dated Dec. 24, 2021.

(Continued)

*Primary Examiner* — Gary Collins
(74) *Attorney, Agent, or Firm* — Grossman, Tucker, Perreault & Pfleger, PLLC

(57) ABSTRACT

The invention relates to an apparatus and a method for controlling 4 a process within a system, particularly a combustion process in a boiler or furnace, comprising the following steps: capturing 1 of state variables ($s_t$) of the system; creating 2 an interference model, which describes the effects of interference-based system changes ($v_t$) on the state variables ($s_t$) of the system; creating 3 a process model, which describes the effects of setting actions ($a_t$) on the state variables ($s_t$) of the system; and controlling 4 the process within the system by performing setting actions ($a_t$) by considering the process model, the interference model and predetermined controlling goals.

11 Claims, 1 Drawing Sheet

(56) References Cited

U.S. PATENT DOCUMENTS

| | | | |
|---|---|---|---|
| 2005/0154477 A1 | 7/2005 | Martin et al. | |
| 2007/0142975 A1* | 6/2007 | Piche | H02J 3/38 |
| | | | 700/286 |
| 2011/0060424 A1 | 3/2011 | Havlena | |
| 2019/0385070 A1* | 12/2019 | Lee | F24F 11/63 |

FOREIGN PATENT DOCUMENTS

| | | |
|---|---|---|
| CN | 104776446 | 7/2015 |
| EP | 0609999 | 8/1994 |
| EP | 1396770 | 7/2007 |
| EP | 1364163 | 4/2008 |
| EP | 3474090 | 4/2019 |
| JP | 10-318503 | 12/1998 |
| JP | 2008-76012 | 4/2008 |

OTHER PUBLICATIONS

Cooper et al., "Feed Forward Uses Models Within the Controller Architecture", Apr. 9, 2015, Alaska, pp. 1-9.

Faieghi et al., "On Fractional-Order PID Design", Applications of MATLAB in Science and Engineering, Sep. 9, 2011, Iran, pp. 273-292.

\* cited by examiner

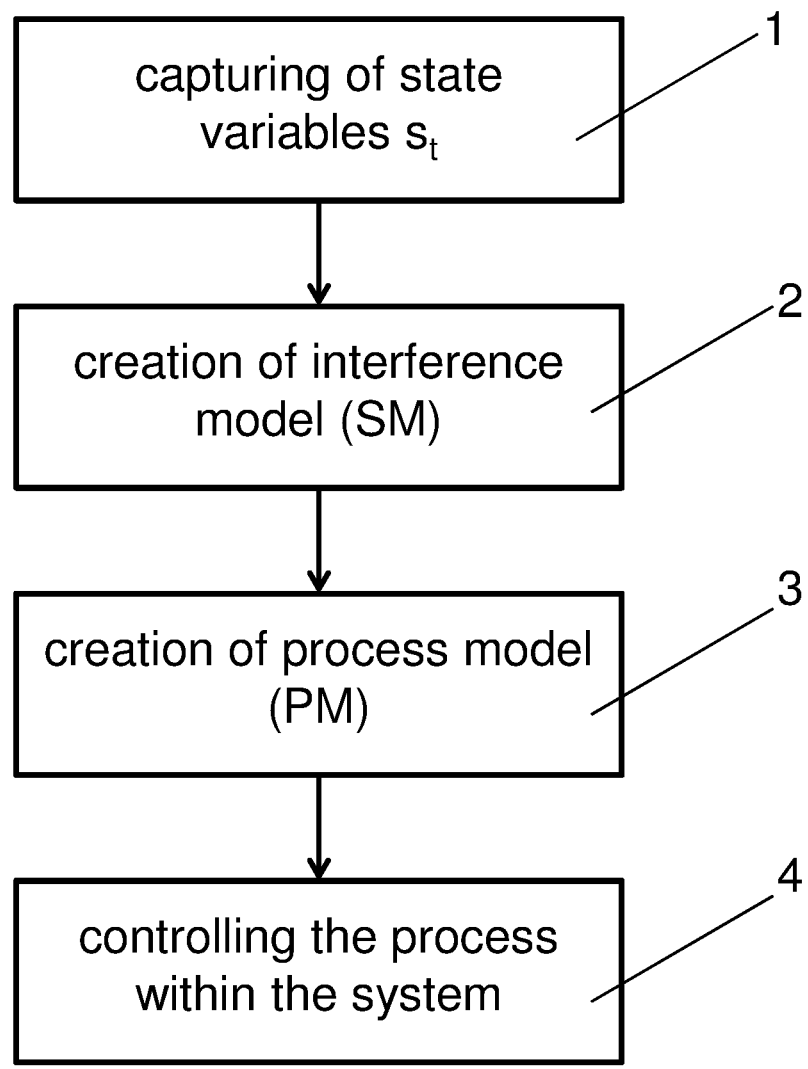

METHOD FOR CONTROLLING A PROCESS WITHIN A SYSTEM, PARTICULARLY A COMBUSTION PROCESS IN A BOILER OR FURNACE

FIELD

The invention relates to a method for controlling a process, preferably a thermodynamic process, within a system, particularly a combustion process in a boiler or furnace.

BACKGROUND

State variables of the system are recorded in such methods, preferably by measuring process variables in the system. Further, a process model is created, which describes the effects of setting actions on the state variables of the system, for example by using a computer-based neural networks. The controlling of the process within the system is achieved by executing setting actions and considering the process model and controlling goals.

In known methods of this kind process variables that are hardly or expensively measurable are predicted by a process model in a neural network. To consider changes in the process three steps are performed cyclical, namely a process analysis for identifying a starting point for the process model, training of the neural network and applying the process model for predictions. This is costly in terms of time and personnel.

In U.S. Pat. No. 5,259,064 A a method is disclosed, in which either a neural network is continuously trained for predictions or two neural networks of the same structure are used, one for predictions and one for training.

U.S. Pat. No. 5,943,660 A discloses a method, which starts from the actual state and uses a linear approach of setting actions for achieving optimisation goals, wherein the two linearization coefficients are each determined by a neural network.

In EP 0 609 999 A1 a method is disclosed, in which, on the one hand, the control signals for the actions required for achieving the current process variables in the system are determined by means of a first neural network, and, on the other hand, the control signals for the necessary actions are determined for the desired, possibly continuously corrected, process variables in the system by means of a second neural network, which is identical to the first neural network.

From EP 1 364 163 B1 a method for controlling a thermodynamic process, particularly a combustion process, is known, in which the state of the system is measured, compared with optimization goals and suitable actions in the system are executed for controlling, wherein a process model is created independently of the optimization goals, which describes the impact of the actions on the state of the system. Further, a situation assessment assesses the state of the system with respect to the optimization goals using quality functions independently from the process model.

From EP 1 396 770 B1 a method for controlling a thermodynamic process is known, in which process values are measured in the system, predictions are calculated in a neural network based on a trained actual process model, compared with optimization goals and suitable actions are performed in the system for controlling the process, wherein simultaneously the process is automatically analysed, at least one new process model is built, trained and compared with the actual process model in terms of the predictions.

SUMMARY

It is an object of the present invention to improve the accuracy of the known methods.

The object is solved according to the invention by a method for controlling a process within a system, particularly a combustion process in a boiler or furnace, comprising the steps:

- capturing of state variables ($s_t$) of the system;
- creating an interference model (SM), which describes the effects of interference-based system changes ($v_t$) on the state variables ($s_t$) of the system;
- creating a process model (PM), which describes the effects of setting actions ($a_t$) on the state variables ($s_t$) of the system; and
- controlling the process within the system by performing setting actions ($a_t$) by considering the process model (PM), the interference model (SM) and predetermined controlling goals.

In the methods known from the prior art a process model is used, that describes the effects of setting actions on the state variables of the systems and at the same time interference-based system changes on the state variables of the system.

The invention is based on the finding, that the creation of an interference model, that describes the effects of interference-based system changes on the state variables of the system, and the creation of a separate process model, which describes the effects of setting actions in the state variables of the system, significantly improves the accuracy of the inventive method for controlling a process within a system, particularly a combustion process in a boiler or furnace, in comparison to a process model, which describes the effects of setting actions on the state variables of the system and at the same time describes the effects of interference-based system changes on the state variables of the system.

Particularly, when creating an interference model according to the present invention, a distinction can be made between effects of short-term interference-base system changes on the state variables of the system and effects of long-term interference-based system changes on the state variables of the system.

The distinction between short-term interference-base changes and long-term interference-based changes depends on the process within the system. For example, in a combustion process in a power plant short-term interference-based system changes can occur over several hours. The distinction between short-term interference-based changes and long-term interference-based changes is preferably done by considering the duration of the controlled process in the system.

The inventive consideration of an interference model during controlling of the process within the system has the advantage, that execution of setting actions could be omitted if, according to the created interference model, it is likely that the effects of the interference-based system changes on the state variables of the system is timely limited and/or the effects of the interference-based system changes on the state variables of the system are within a predetermined range.

The inventive consideration of the process model, the interference model and the predetermined controlling goals during controlling of the process within the system significantly improves the accuracy of the method for controlling the process within the system.

According to a variant of the invention the state variables ($s_t$) are captured by sensors of the system or a manual and/or automatic sample evaluation. Preferred is a capturing of the state variables ($s_t$) by sensors because this can take place continuously. However, if state variables ($s_t$) cannot directly be captured by sensors, manually and/or automatically gathered samples must be analysed and provided to the inventive method.

According to a preferred variant of the invention during the creation of the interference model (SM) past interference-based system changes ($v_t$) are considered for integration in a temporal context. The consideration of past interference-based system changes during the creation of the interference model (SM) results in a continuous improvement of the interference model (SM).

In a further preferred variant of the invention the interference model (SM) is adapted continuously by effects of interference-based system changes ($v_t$) on the state variables ($s_t$) of the system. By continuously adapting the interference model by effects of interference-based system changes on the state variables of the system the inventive method always has access to an up-to-date interference model (SM) for controlling the process within the system.

In combination with the consideration of past interference-based system changes during the creation of the interference model always an up-to-date and with respect to past interference-based system changes optimized interference model is available.

According to a variant of the inventive method the interference model (SM) is created by a test run of the system and/or by expert knowledge. The initially by a test run of the system and/or by expert knowledge created interference model can be continuously adapted by considering effects of interference-based system changes ($v_t$) on the state variables ($s_t$) of the system and/or by considering of past interference-based system changes ($v_t$) for integration in a temporal context.

In a further variant of the inventive system the interference model (SM) is created, and particularly continuously adapted (trained), by a computer-based neural network.

The neural network is trained in particular by means of known evolutionary strategies, genetic algorithms, genetic programming or evolutionary programming, preferably in the context of an autonomous selection- and/or optimization process.

According to a particularly preferred variant of the invention multiple, independently from one another, interference models (SM) are created and during the controlling of the process within the system the interference model (SM) is considered that momentarily best describes the interference-based system changes ($v_t$). Preferably multiple computer-based neural networks are created for the independent interference models (SM). During controlling of the process within the system the interference model (SM) is considered, which provides the best results for the current situation. Depending on the current process situation the interference models (SM) are compared with each other and during controlling one interference model (SM) is chosen.

In a particularly preferred variant of the invention each interference model (SM) is created for predicting a certain group of interference-based system changes ($v_t$). The interference-based system changes ($v_t$) are divided by the interference models (SM) into groups (cluster) and each interference model (SM) is particularly designed for predicting a certain group of interference-based system changes ($v_t$). During controlling of the process within the system the interference model (SM) is considered, which provides the best results for the current interference-based system changes ($v_t$).

If interference-based system changes ($v_t$) occur during the controlling of the process within the system, which are not covered by a group of one of the interference models (SM), a new interference model (SM) for the new group of interference-based system changes ($v_t$) is created and afterwards improved (trained) by measurements and performing of setting actions ($a_t$).

Advantageously, a unique identifier (genetic code) can be assigned to each interference model (SM) respectively each group (cluster) belonging to the interference models (SM), to simplify the distinguishing of the single interference models (SM) respectively groups (cluster) of interference-based system changes ($v_t$).

Furthermore, the quality of the single interference models (SM) respectively groups (cluster) of interference-based system changes ($v_t$) can be determined and/or adjusted.

According to a further preferred variant of the invention the interference model (SM) considers multiple assumed future effects of interference-based system changes ($v_t$) on the state variables ($s_t$) of the system. The interference model (SM) creates a prediction of future expected effects of interference-based system changes ($v_t$) on the state variables ($s_t$) of the system and considers these during the current situation of the process within the system.

According to variant of the inventive method during the creation of the process model (PM) past effects of setting actions ($a_t$) on the state variables ($s_t$) of the system are considered for integration in a temporal context. Thus, during the creation of the process model (PM) the effects of setting actions ($a_t$) on the state variables ($s_t$) of the system known from the past are considered, so that the process model (PM) is improved continuously considering the past.

In a further inventive variant, the process model (PM) is adapted continuously by effects of setting actions ($a_t$) on the state variables ($s_t$) of the system. Thus, the process model (PM) is continuously improved. Particularly by considering past effects of setting actions ($a_t$) on the state variables ($s_t$) of the system an improved and always up-to-date process model (PM) is created.

According to an inventive variant the process model (PM) is created by a test run of the system with at least an exemplary execution of possible setting actions ($a_t$) and/or by expert knowledge. A such created process model can afterwards be continuously adapted by effects of setting actions ($a_t$) on the state variables ($s_t$) of the system and/or by considering past effects of setting actions ($a_t$) on the state variables ($s_t$) of the system during creation of the process model (PM).

According to an advantageous variant of the invention the process model (PM) is created, and preferably continuously adapted (trained), by a computer-based neural network.

The neural network is trained in particular by means of known evolutionary strategies, genetic algorithms, genetic programming or evolutionary programming, preferably in the context of an autonomous selection- and/or optimization process.

According to a particularly preferred variant of the invention multiple, independently from one another, process models (PM) are created and during the controlling of the process within the system the process model (PM) is considered that momentarily best describes effects of setting actions ($a_t$) on the state variables ($s_t$) of the system. In particular, multiple, from one another independent process models (PM) are implemented by different computer-based neural networks. Thus, during controlling of the system using the inventive method the process model (PM) can be considered, that best maps the current effects of setting actions ($a_t$) on the state variables ($s_t$) of the system.

According to a further variant of the inventive method the process model (PM) considers multiple assumed future effects of setting actions ($a_t$) on the state variables ($s_t$) of the system. Thus, the process model (PM) considers a prediction of assumed effects of setting actions ($a_t$) on the state variables ($s_t$) of the system.

Therefore, the process model (PM) can consider past effects of setting actions ($a_t$) on the state variables ($s_t$) of the system, continuously consider effects of setting actions ($a_t$) on the state variables ($s_t$) of the system and further create and also consider a prediction of future assumed effects of setting actions ($a_t$) on the state variables ($s_t$) of the system.

The invention further relates to an apparatus for executing one of the aforementioned methods, comprising a system to be controlled with sensors for capturing of state variables ($s_t$), actuators for performing setting actions ($a_t$) and a control unit, preferably a computing device, connected to the system. The inventive method can be for example implemented by a software on the computing device.

The present invention is not limited to thermal processes, like e.g. combustion processes in a boiler or furnace, but can be used in many process controls, like e.g. controlling a grinding process in a grinding device.

BRIEF DESCRIPTION OF THE DRAWINGS

In the following the inventive method will be explained with reference to the embodiment shown in FIG. 1.

FIG. 1 shows the sequence of an inventive method for controlling a process within a system.

DETAILED DESCRIPTION

FIG. 1 shows the sequence of an inventive method for controlling a process within a system, particularly a combustion process in a boiler or furnace.

In a first step the state variables ($s_t$) of the system are captured 1. The capturing 1 of the state variables ($s_t$) is performed by sensors of the system or by manual and/or automatic evaluation of samples.

During the execution of the inventive method an interference model (SM) is created, which describes the effects of interference-based system changes ($v_t$) on the state variables ($s_t$) of the system. The interference model (SM) is for example created by a test run of the system and/or by expert knowledge. During the execution of the inventive method past interference-based system changes ($v_t$) can be considered during creation of the interference model (SM) for integration in a temporal context. Furthermore, the interference model (SM) can be continuously adapted by effects of interference-based system changes ($v_t$) on the state variables ($s_t$) of the system.

The interference model (SM) is for example created 2, and particularly continuously adapted, by a computer-based neural network.

Particularly preferred multiple, independent from one another, interference models (SM) are created 2 and during controlling 4 of the process within the system the interference model (SM) is considered, which best maps the current interference-based system changes ($v_t$).

For improving the accuracy of the inventive method, the interference model (SM) can consider future expected effects of interference-based system changes ($v_t$) on the state variables ($s_t$) of the system.

In a further step of the inventive method, a process model (PM) is created, which describes the effects of setting actions ($a_t$) on the state variables ($s_t$) of the system.

The process model (PM) is for example created 3 by a test run of the system with at least an exemplary execution of possible setting actions ($a_t$) and/or by expert knowledge. During the creation 3 of the process model (PM) preferably past effects of setting actions ($a_t$) on the state variables ($s_t$) of the system are considered for an integration in a temporal context. Furthermore, the process model (PM) is preferably continuously adapted by effects of setting actions ($a_t$) on the state variables ($s_t$) of the system.

The process model (PM) is advantageously created 3, and particularly continuously adapted, by a computer-based neural network.

Particularly preferred multiple, independent from one another, process models (PM) are created 3 and during controlling the process within the system the process model (PM) is considered, which currently best maps the effects of setting actions ($a_t$) on the state variables ($s_t$) of the system.

For further improving the inventive method the process model (PM) considers future expected effects of setting actions ($a_t$) on the state variables ($s_t$) of the system. According to the inventive method the process within the system is controlled 4 by performing setting actions ($a_t$) by considering the process model (PM), the interference model (SM) and predetermined controlling goals.

LIST OF NUMERALS 1 capturing of state variables ($s_t$)
2 creation of an interference model (SM)
3 creation of a process model (PM)
4 controlling the process within the system

What is claimed is:

1. A method for controlling a process within a system, particularly a combustion process in a boiler or furnace, comprising the following steps:
   capturing of state variables ($s_t$) of the system;
   creating an interference model, which describes the effects of interference-based system changes ($v_t$) on the state variables ($s_t$) of the system;
   creating a separate process model, which describes the effects of setting actions ($a_t$) on the state variables ($s_t$) of the system; and
   controlling the process within the system by performing setting actions ($a_t$) by considering the process model, the interference model and predetermined controlling goals.

2. The method according to claim 1, wherein the state variables ($s_t$) are captured by sensors of the system or a manual and/or automatic sample evaluation.

3. The method according to claim 1, wherein during the creation of the interference model past interference-based system changes ($v_t$) are considered for integration in a temporal context and/or wherein during the creation of the process model past effects of setting actions ($a_t$) on the state variables ($s_t$) of the system are considered for integration in a temporal context.

4. The method according one of claim 1, wherein the interference model is adapted continuously by effects of interference-based system changes ($v_t$) on the state variables ($s_t$) of the system and/or wherein the process model is adapted continuously by effects of setting actions ($a_t$) on the state variables ($s_t$) of the system.

5. The method according to one of claim 1, wherein the interference model and/or the process model is created by a test run of the system and/or by expert knowledge.

6. The method according to one of claim 1, wherein the interference model and/or the process model is created, and particularly continuously adapted, by a computer-based neural network.

7. The method according to one of claim 1, wherein multiple, independently from one another, interference models are created and during the controlling of the process within the system the interference model is considered that momentarily best describes the interference-based system changes ($v_t$).

8. The method according to one of claim 1, wherein multiple, independently from one another, process models are created and during the controlling of the process within the system the process model is considered that momentarily best describes effects of setting actions ($a_t$) on the state variables ($s_t$) of the system.

9. The method according to one of claim 1, wherein the interference model considers multiple assumed future effects of interference-based system changes ($v_t$) on the state variables ($s_t$) of the system and/or wherein the process model considers multiple assumed future effects of setting actions ($a_t$) on the state variables ($s_t$) of the system.

10. An apparatus for executing the method according to claim 1 comprising a system to be controlled with sensor for capturing of state variables ($s_t$), actuators for performing setting actions ($a_t$) and a control unit connected to the system.

11. The apparatus of claim 10, wherein the control unit is a computing device.

* * * * *